Figure 1:
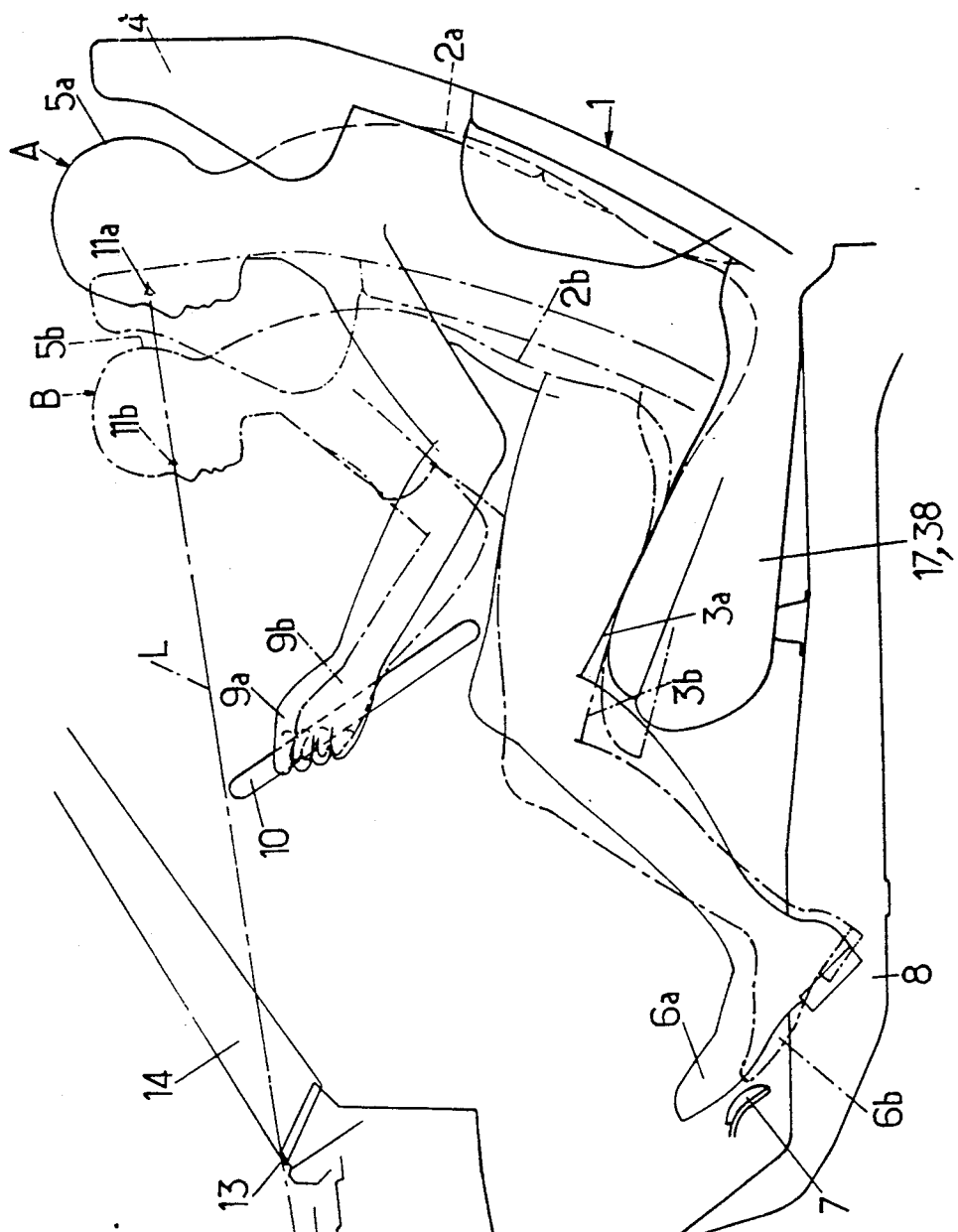

United States Patent [19]

Courtois

[11] Patent Number: 5,171,062
[45] Date of Patent: Dec. 15, 1992

[54] ADJUSTABLE FRONT SEATS OF MOTOR VEHICLES HAVING EXTENDING FRONT PORTION AND HEAD REST

[75] Inventor: Bernard Courtois, Morigny-Champigny, France

[73] Assignee: Bertand Faure Automobile, France

[21] Appl. No.: 612,464

[22] Filed: Nov. 14, 1990

[30] Foreign Application Priority Data

Nov. 22, 1989 [FR] France .................................. 89 15334

[51] Int. Cl.⁵ ........................... B60N 2/02; B60N 2/24; A47C 1/02
[52] U.S. Cl. ..................................... 297/340; 297/337
[58] Field of Search ............... 297/311, 313, 316, 317, 297/322, 325, 326, 327, 328, 329, 330, 337, 340, 341, 342, 343, 344, 400, 284 B, 284 H

[56] References Cited

U.S. PATENT DOCUMENTS

| | | | |
|---|---|---|---|
| 3,471,198 | 10/1969 | Homier et al. | 297/410 |
| 4,386,803 | 6/1983 | Gilderbloom | 297/330 X |
| 4,401,343 | 8/1983 | Schmidt | 297/337 X |
| 4,773,703 | 9/1988 | Krügener et al. | 297/337 |
| 4,776,633 | 10/1988 | Knoblock | 297/457 X |
| 4,981,326 | 1/1991 | Heidmann | 297/457 X |
| 4,988,145 | 1/1991 | Engel | 97/302 X |

FOREIGN PATENT DOCUMENTS 2141623  1/1985  United Kingdom ................ 297/337

Primary Examiner—Joseph Falk
Assistant Examiner—James M. Gardner
Attorney, Agent, or Firm—Larson and Taylor

[57] ABSTRACT

A front seat for a motor vehicle is disclosed, characterized in that its sitting portion has a front part (16) and a rear part (15) mounted for sliding horizontally one on the other in the longitudinal direction of the seat and an adjustment mechanism actuatable by a single control member (29) and adapted for modifying both the longitudinal position of the front part, the longitudinal position of the rear part and the level of this rear part, so that any backward movement of the front part corresponds to lengthening of the sitting portion (17) and lowering of its rear part, and conversely. Furthermore, any lengthening of the sitting portion preferably results in raising the top portion (4) of the seat-back and conversely.

11 Claims, 4 Drawing Sheets

ADJUSTABLE FRONT SEATS OF MOTOR VEHICLES HAVING EXTENDING FRONT PORTION AND HEAD REST

The invention relates to the front seats of motor vehicles and more particularly, but not exclusively, to those intended for the drivers of such vehicles.

These seats should suitably fulfil simultaneously a certain number of conditions and, in particular, the following ones which are defined for a driver's seat by way of illustration:

correct support of the driver all along his back, his hindquarters and thighs as far as the front ends of the latter, natural position of the driver's hands on the steering wheel without his arms being exaggeratedly stretched or bent, natural position of the tip of at least one of his feet on a control pedal when the corresponding heel rests on the floor of the vehicle, positioning of the driver's eyes at a sufficient level for him to see in front of the vehicle a relatively close portion of the roadway.

In practice, this latter condition is defined as follows: the driver's eyes must not be situated below the plane tangential to the upper surface of the hood of the vehicle and passing through the base of the portion of the windshield situated in front of the driver, said plane being considered as defining the correct "line of sight" of the driver.

It is of course not possible, in a given vehicle, for the same seat to fulfil the whole of these conditions without adjustment for all the morphologies of men and women drivers.

It will be recalled in this respect that in Europe about 5% of persons old enough to drive a vehicle have a stature less than 1 m 60 cm and that about 5% of these persons have a stature greater than 1 m 90 cm.

This is why, in the embodiments proposed at the present time for the front seats of motor vehicles, numerous adjustment mechanisms are provided for adjustment respectively of the height of the sitting portion, its inclination, its longitudinal position in the vehicle, the inclination of the seat-back, the height of the head-rest etc.

Such mechanisms are costly and experience shows that overall adjustment thereof is so difficult that most drivers do not use them in an optimum way and are satisfied with imperfect comfort.

In most cases, furthermore, some adjustments are not provided at all.

Thus, the length of the sitting portion is calculated so that persons having the shortest legs may have their back applied correctly against the seat-back of the seat without requiring the use of an intermediate cushion; the result is of course that such a sitting portion is much too short to correctly support the front thigh portions of persons with long legs, which may cause pains in these legs during long journeys.

The aim of the invention is especially to overcome these different drawbacks by providing a seat which is very easy to adjust and with excellent adaptation to all possible morphologies of men and women drivers.

For this, the vehicle seats according to the invention are essentially characterized in that their sitting portions have a front part and a rear part mounted for sliding horizontally one on the other in the longitudinal direction of the seat and an adjustment mechanism actuatable by a single control member and adapted for modifying both the longitudinal position of the front part, the longitudinal position of the rear part and the level of this rear part, so that any backward movement of the front part corresponds to lengthening of the sitting portion and lowering of its rear part, and conversely.

In preferred embodiments, recourse is further had to one and/or other of the following arrangements:

the rear part and the front part of the sitting portion are mounted for pivoting respectively on two horizontal transverse shafts carried by the base of the seat and the adjustment mechanism is arranged so that the rear shaft may move along a first fixed rectilinear or substantially rectilinear path, inclined slightly with respect to the horizontal and descending towards the rear and so that the front shaft may move along a second fixed rectilinear or substantially rectilinear and horizontal or substantially horizontal path with a fixed ratio R between 1.5 and 2.5 between the travel distances of these two shafts, the angle formed between the two paths is between 10° and 30°, the rear shaft is connected to a nut cooperating with a first screw connected to the base of the seat and extending along the first fixed path, the front shaft is connected to a nut cooperating with a second screw connected to the base of the seat and extending along the second fixed path and rotation of the first screw is tied up with that of the second so that the ratio between the travel distances of the two nuts along their screws is equal to R, the ratio between the pitches of the two screws is equal to R and rotation of these screws is synchronized by cooperation of two truncated cone shaped gears fixed respectively thereto, the two shafts on which the front and rear parts of the sitting portion are mounted respectively for pivoting are carried by the upper ends of two rigid links, the first of which is more inclined with respect to the vertical than the second one and the two lower ends of which are mounted for pivoting about two fixed transverse horizontal shafts of the base of the seat, and the two links are joined together by a rigid tie mounted for pivoting thereon about a fifth and a sixth transverse horizontal shafts, the fifth shaft, connected to the rear link, being relatively close to the lower end of this link whereas the sixth shaft, connected to the front link, is relatively close to the upper end of this link, in a seat according to the preceding paragraph, the pivoting mounting of the first shaft on the rear link is provided so as to make sliding of this shaft possible parallel to itself along this link, said shaft is itself mounted so as to be able to slide parallel to itself along a fixed guide inclined with respect to the horizontal and defining the first above path, and the single control member is adapted for adjusting the position of this shaft along its guide, the top portion of the seat-back, comprising the head-rest, is mounted for vertical sliding in the lower portion of this seat-back and the adjustment mechanism is adapted so that its single control further modifies the level of said top portion of the seat-back in a rising direction during lengthening of the sitting portion and conversely, the vertical movement of the top portion of the seat-back is obtained by rotation of an endless screw rotatably mounted in the seat-back and connected axially to this seat-back, which screw cooperates with a nut fast with said top portion, said screw being synchronized with another endless screw mounted for rotation in the rear part of the sitting portion and connected axially thereto, which screw cooperates reversibly with a nut fast with the front part of the sitting portion, a crank lever is mounted for pivoting about a seventh transverse horizontal shaft connected to the rear part of the sitting portion, the end of one of the arms of this lever is coupled by a substantially horizontal link to the front part of the sitting portion and the end of the other arm of said lever is coupled by a substantially vertical link to the top portion of the seat-back, the space freed by relative movement apart of the two parts forming the sitting portion or the seat-back is closed externally by a flexible web which is permanently stretched towards the inside of the seat by appropriate resilient means.

Apart from these main arrangements, the invention comprises certain other arrangements which are preferably used at the same time and which will be more explicitly discussed hereafter.

In what follows, two preferred embodiments of the invention will be described with reference to the accompanying drawings in a way which is of course in no way limitative.

Figure 2:
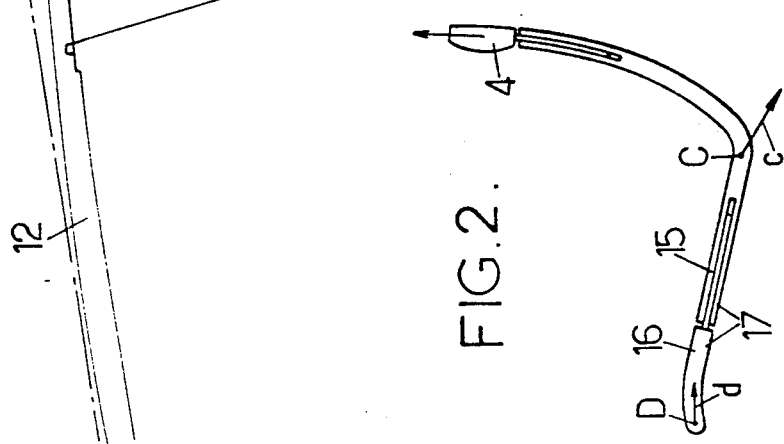
Figure 3:
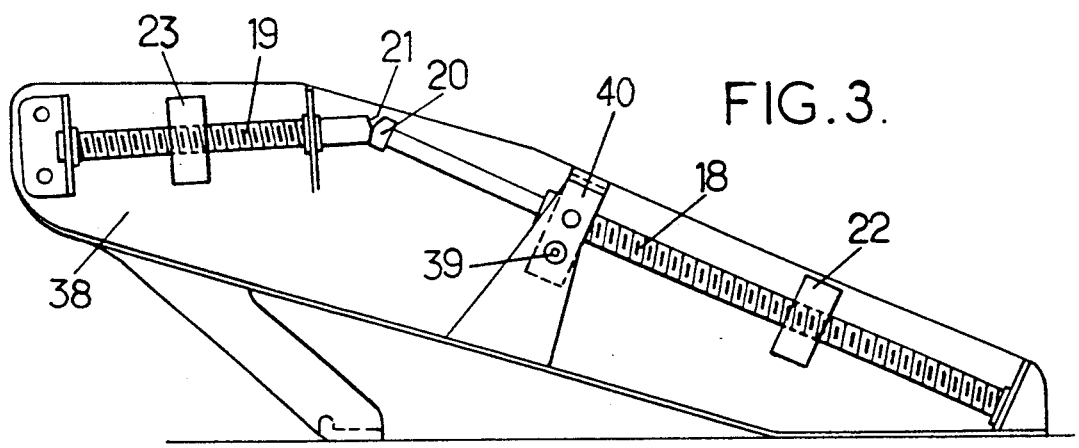
Figure 6:
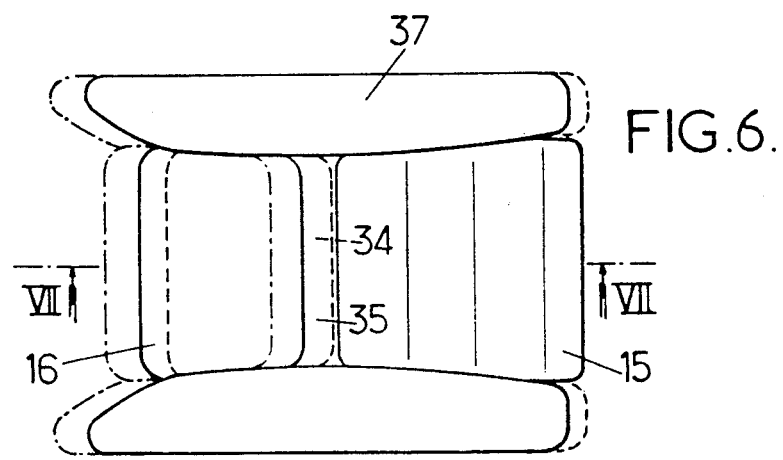
Figure 7:
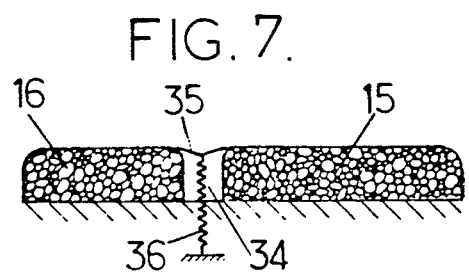
Figure 4:
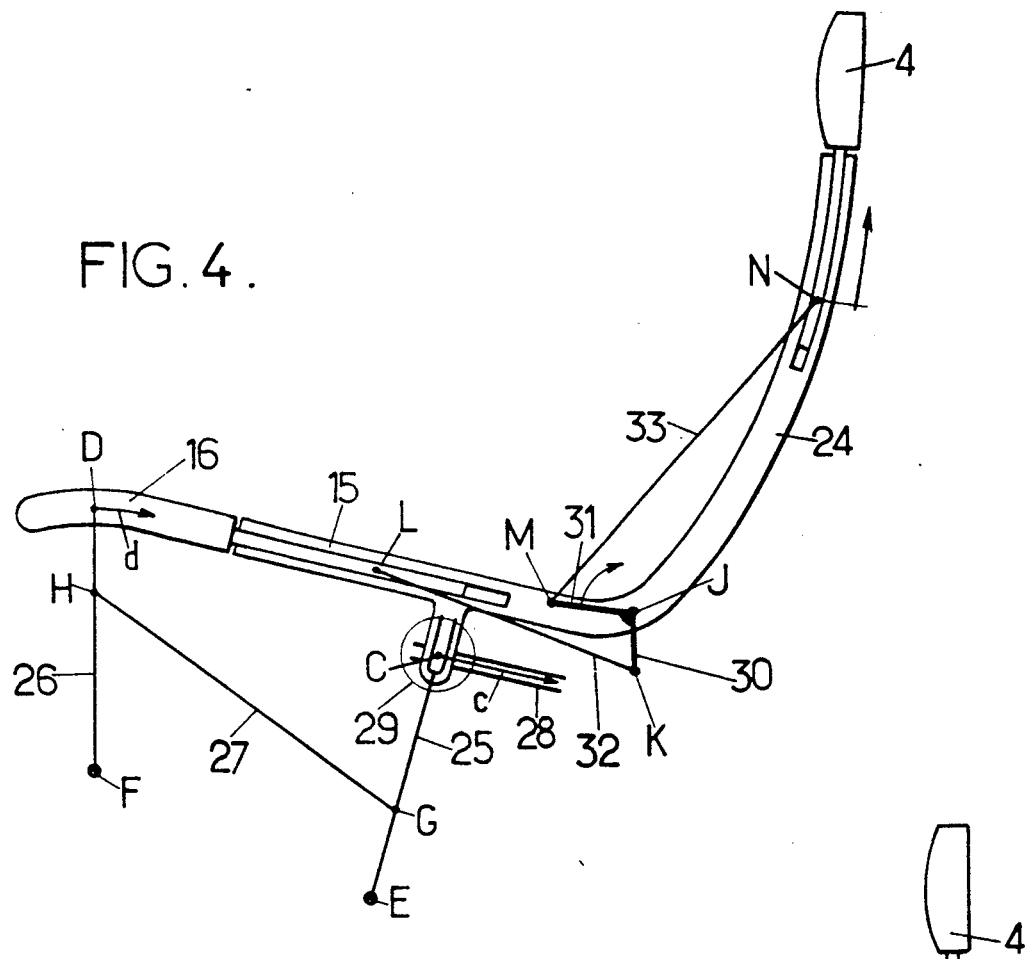
Figure 5:
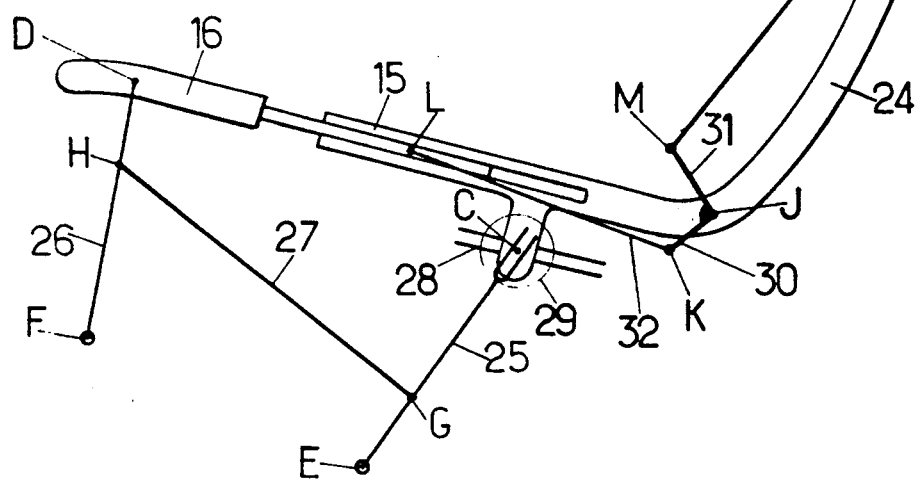
Figure 8:
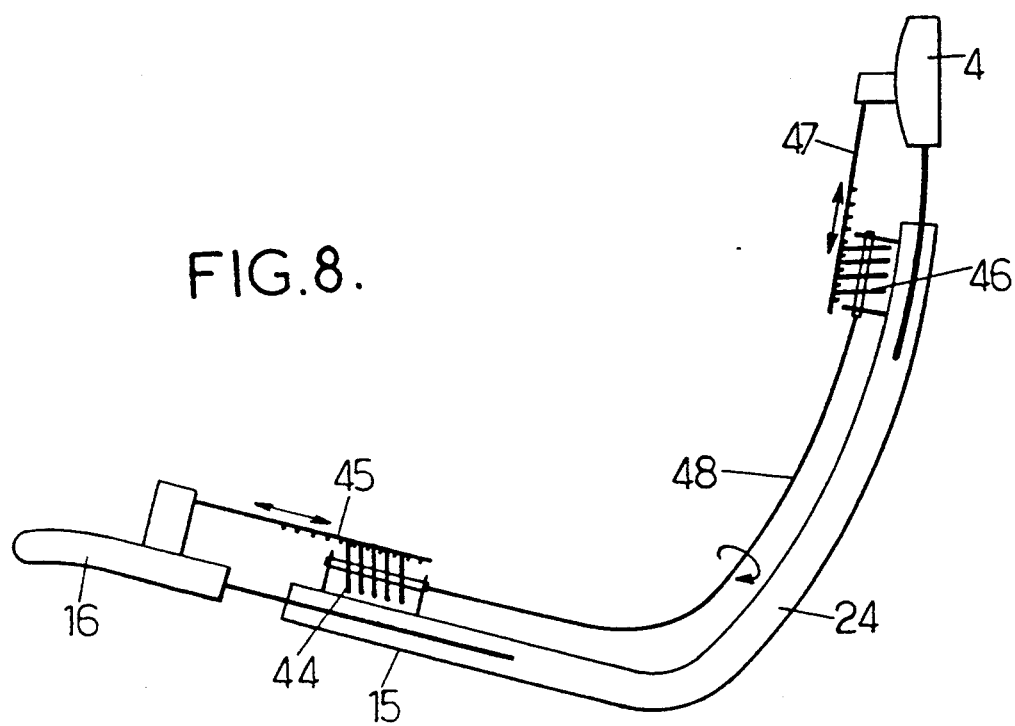

FIG. 1 of these drawings shows schematically the front part of a vehicle passenger compartment showing the two endmost positions occupied by a seat formed in accordance with the invention, one of these two positions, the rear and low position, shown with continuous lines, corresponding to the seated position of a tall driver whereas the other, in the forward and raised position, corresponds to the seated position of a woman driver of small stature, FIG. 2 shows very schematically such a seat as well as the adjustments which may be applied thereto in accordance with the invention, FIG. 3 shows a side view of a seat base according to the invention, FIGS. 4 and 5 schematically, but in a slightly more precise way than FIG. 2, another seat formed in accordance with the invention, respectively in its position corresponding to the seated position of a short person and in its position corresponding to the seated position of an average sized person, FIGS. 6 and 7 show respectively in a top view and in longitudinal vertical section through VII—VII of FIG. 6, the cushion of a sitting portion according to the invention, FIG. 8 is an enlarged central cross-sectional view of an element shown schematically in FIGS. 1 through 3, FIG. 9 is a schematic view similar to FIG. 2 but showing schematically further details of the invention.

As mentioned above, the invention concerns a vehicle front seat 1 (FIG. 1) which is adjustable so as to support not only a tall driver A (shown with continuous lines) but also a short woman driver B (shown with a chain-dotted line), this support fulfilling at the same time each of the following conditions :

optimum support of the user of the seat not only at the level of his back 2a, 2b, but also of his thighs 3a, 3b, with, in each case, arrangement of the upper portion 4 of the seat-back forming the head-rest, at a short: horizontal distance at the rear of the nape of the neck 5a, 5b of the user, easy application of the tip of the foot 6a, 6b of the user on at least one control pedal of the vehicle, when the corresponding heel rests on the floor 8 of the vehicle, natural position of the hands 9a, 9b of the user on the steering wheel 10, and location of the eyes 11a, 11b of the user at least at the level of the correct line of sight L defined as being tangential to the hood 12 of the vehicle and passing through the base 13 of the windshield 14.

For this, and as can be seen in FIG. 1, means are provided for the following adjustments, from the position of the seat corresponding to the short woman driver B:

appreciable backward movement and slight lowering of the bottom of the seat, smaller backward movement of the front edge of the sitting portion, which corresponds to lengthening of this portion, and preferably raising of the upper portion of the seat-back.

More precisely, these means are adapted so that, from the above position corresponding to a user of short stature, actuation of a single control member by this user seated on the seat has essentially the two following results:

movement of a rear point C connected to the framework of the sitting portion rearwards and downwards along a substantially rectilinear and slightly downward path c over length m, and movement of a front point D connected to the framework of the sitting portion rearwards along a substantially rectilinear and horizontal path d over a length equal to m/R, R being a number between 1.5 and 2.5 and preferably equal to 2.

These two movements are considered in absolute value.

They result in a relative lengthening of the sitting portion of length $m-(m/R)$ which involves a mutual sliding assembly between the two rear 15 and front 16 parts of the sitting portion 17 : in short, a relative forward movement of the front part 16 of the sitting portion is observed with respect to the rear part 15, over a distance equal to $m-(m/R)$.

Lowering of the rear part 15 is also observed.

Furthermore, in the preferred embodiments, during each backward movement of amplitude m of the rear point C of the sitting portion, there occurs raising of the upper portion 4 of the seat-back by a substantially identical amplitude m.

In the embodiment illustrated in FIG. 3, the two slightly inclined c and horizontal d paths assigned respectively to the two points C and D of the sitting portion are materialized by two screws 18, 19 which are both mounted for rotation on the same base 40.

These two screws are here joined angularly together by cooperation of two truncated cone shaped pinions 20, 21 which are fixed to their respective extensions, but their mutual angular connection could be achieved in any other desirable way, for example by means of a flexible shaft.

The points C and D are for example shafts connected to the two parts 15 and 16 considered of the sitting portion, which shafts are mounted for pivoting on two nuts 22 and 23 cooperating respectively with the two screws 18 and 19.

The ratio between the pitches of these two screws is equal to R.

In a variant, two screws with identical pitches are used, with interpositioning of a reducing train of ratio R between these two screws.

These screw embodiments lend themselves particularly well to control by an electric motor.

This is what has been assumed in FIG. 3 where rectangle 40 designates a box (see FIG. 8) containing a worm gear 41 able to cooperate with an input endless wheel 39, said gear 41 being confined between two ball bearings 42,43 and being solid with the screw 18; said screw 18 is inclined and the described mounting (38,39,41–43) forms a ball cage adapted to absorb the axial forces exerted downwards and rearwards by the weight of the user on the inclined screw 18 at the level of nut 22. Reference 39 further designates the input of a drive torque, i.e., connection of the endless wheel with a flexible shaft itself resisting torsional forces and driven in rotation by a motor with its transverse shaft situated under the sitting portion.

Rotation of screw 18 may be taken in any appropriate way and transmitted as a whole to another screw (not shown) mounted in the seat-back and cooperating with a nut itself connected vertically, but not angularly, to the top portion 4 of said seat-back, which is then mounted for vertical sliding in the seat-back.

This latter connection is provided so that the top portion of the seat-back rises automatically when the sitting portion of the seat is extended and conversely.

In an advantageous embodiment, the relative sliding of the front part 16 of the sitting portion with respect to its rear part 15 is used so as to cause rotation of a longitudinal endless screw shown schematically at 44 in FIG. 8, connected axially, but not rotatably, to said rear part 5: for this, it is sufficient to choose for said screw a pitch making reversible control of this screw possible and causing a nut shown schematically at 45 in FIG. 8, or finger fast with the front part of the sitting portion to cooperate therewith.

It is then advantageously the rotation of this screw 44 which is transformed into rotation of a second endless screw shown schematically at 46 in FIG. 8 mounted for rotation in the seat-back 24, but connected axially thereto and cooperating with a nut or shown schematically at 47 in FIG. 8, finger fast with the top portion 4 of this seat-back, the ratio between the pitches and/or angular movements of the two endless screws considered being chosen preferably so that relative movement of the top portion of the seat-back with respect to the seat-back itself is of the order of the absolute horizontal movement of the rear part 15 of the sitting portion and not of the relative movement of this rear part with respect to its front part.

This solution has the advantage that the two endless screws 44 and 46 are mounted on the same rigid framework 24, which simplifies mutual synchronization thereof, particularly by means of a flexible shaft 48.

In the embodiment shown schematically in FIGS. 4 and 5, the screw 18, 19 and nut 22, 23 mechanisms described above are replaced by link mechanisms.

In these figures, the main frame of seat 1 forms the low portion 24 of the seat-back and the rear part 15 of the sitting portion.

The front part 16 of the sitting portion is mounted for horizontal sliding on the front end of this frame and the top portion 4 of the seat-back, comprising the head-rest, is mounted for vertical sliding on the upper rear portion of said frame.

To simplify, a simple transverse projection of the linkage mechanism will be considered in the plane of the drawing, with single links, but in practice, some at least of these links are advantageously formed by sets of two parallel links disposed on both sides of the seat and joined rigidly together.

The points C and D connected respectively to the rear part and the front part of the sitting portion correspond to two first transverse horizontal shafts disposed respectively at the upper ends of two rigid links 25, 26 themselves mounted for pivoting at their lower ends on third and fourth horizontal transverse shafts E and F connected to the base 38 of the seat.

For the position of the seat shown in FIG. 4 and corresponding to the "minimum stature" adjustment, the first link 25 is slightly inclined with respect to the vertical and rearwards and the other link 26 is substantially vertical.

These two links are connected together by a rigid tie 27 mounted for pivoting thereon about respectively a fifth transverse horizontal shaft G disposed relatively close to shaft E and a sixth transverse horizontal shaft H disposed relatively close to the upper shaft D.

Furthermore, the connection between shaft C and the upper end of link 25 is provided so that relative sliding is possible along said link 25, whose upper end ends for example for this purpose in a fork with parallel teeth.

Finally, shaft C is mounted so as to be able to slide along a rectilinear guide 28 inclined slightly with respect to the horizontal and descending towards the rear.

It is here the position of this shaft C along guide 28 which may be locked or adjusted as the user of the seat desires by means of a control member which is shown schematically by the handle 29.

FIG. 4 corresponds to the state of seat 1 corresponding to use by the shortest users 8 : link 26 is then substantially vertical, link 25 being slightly inclined rearwards with respect to the vertical and shaft C is at the front end of its guide 28.

The arrows in FIG. 4 show the movements which are imposed on the different points of the mechanism for adapting the seat to the support of more and more tall users and FIG. 5 shows the seat condition for the middle of the adjustment travels.

To adjust the seat from its condition shown in FIG. 4, it is sufficient for the user sitting in this seat to unlock shaft C by means of member 29, then move this shaft rearwards along guide 28.

If, as before, the travel of this shaft C is called m, said control moves the front shaft D rearwards over a distance of about m/2 and moves the rear shaft C over a distance m rearwards also and a little downwards, along a path parallel to guide 28.

This difference between the distances travelled by the two shafts C and D is obtained automatically because of the presence of tie 27 between the two links 25 and 26, which causes on the assembly a deformation in the form of a false parallelogram with different travel distances for the two mobile shafts C and D.

It is further the mounting of shaft C on link 28 for vertical sliding which makes its rectilinear translation along guide 28 possible, despite the rotatable mounting of link 25 about the lower fixed shaft E.

In conclusion, the controlled movement of shaft C provides simultaneously :

a relatively large backward movement of the bottom of the seat with slight lowering of this bottom due to the inclination of guide 28, and lengthening of the sitting portion with, simultaneously, a slight backward movement of its front edge.

It should also be noted that the relative lowering of the bottom of the seat with respect to the front shaft D results in a slight raising of the front edge of the sitting portion and especially in a slight rearward inclination of the seat-back : the seat considered behaves then as if its seat-back were hinged about a lower shaft, while comprising no hinging mechanism of usual type. Of course, this observation relative to the inclination of the seat-back is quite applicable also to the above described screw embodiment.

The seat is thus well adapted to supporting a user of average height.

At the end of the adjustment travel of shaft C, the user again locks the shaft in the position which it then occupies with respect to guide 28 by means of member 29.

Instead of causing such locking, the user may continue the control which has just been described, which continues the above described deformations and movements so as to adapt the seat for supporting a tall user.

The embodiment illustrated in FIGS. 4 and 5 is improved so as to provide height adjustment of the top portion 4 of the seat-back at the same time as the preceding adjustments.

In accordance with this improvement, a lever cranked substantially at right angles, comprising two arms 30, 31, is mounted for pivoting about a seventh horizontal transverse shaft J connected to the framework 15, 24 of the seat, the end K of one of the arms 30 of this lever is coupled by a substantially horizontal link 32 to a point L of the front part of the sitting portion and end M of the other arm 31 of said lever is coupled by a substantially vertical link 33 to a point N of the top portion of the seat-back.

The cranked lever 30, 31 is oriented so that, for the initial condition of the seat corresponding to use by a user of small stature, its arm 30 is substantially vertical and its arm 31 extends forwards.

It can be seen that the relative longitudinal movement of point L of the front part 16 of the sitting portion with respect to the rear part 15 is transformed into substantially vertical movements of point N connected to the top portion 4 of the seat-back.

The ratio between the amplitudes of these two movements, which is readily adjustable by adjusting the lengths of the different lever arms of the mechanism, is provided so that the vertical travel of the top portion 4 of the seat back is substantially equal to the horizontal travel of the rear part 15 of the sitting portion.

It will be noted that, in the above described link mechanism, the weight of the seat is transmitted to its base through shafts C and D, link 26 and slide 28.

These parts and the corresponding pivoting mountings must then be sufficiently resistant, in particular to vertical compression, to provide transmission of the corresponding forces, whatever the inclination of the links.

Appropriate means, such as a compensating spring, may be added between the sitting portion and its base to take over at least a part of the forces considered.

Purely by way of indication and of course in no way limitative of the invention :

inclination with respect to the horizontal of the substantially rectilinear path c imposed on the movement of shaft C connected to the rear part of the sitting portion is preferably about 20°, being generally between 10° and 30°, the travel distance of this shaft C along its path—to which the travel distance of the top portion 4 of the seat-back is preferably equal—is about 150 mm, the rearwards travel, in absolute value, of shaft D connected to the front part of the sitting portion is about half that of shaft C, the ratio R between these two travel distances being preferably about 2 and generally between 1.5 and 2.5.

Of course, the above described method of converting the relative movements of the two parts of the sitting portion into vertical movements of the top portion of the seat-back, using at least one endless screw with reversible control, may be perfectly well associated with the link mechanism 25 and 26.

Extension of the sitting portion 17, due to relative sliding of its front part 16 forwards with respect to its rear part 15, creates a space between these two parts.

This space has been designated by the reference 34 in FIGS. 6 and 7.

In FIG. 6, front part 16 of the sitting portion—which is assumed to comprise not only a central cushion, but also two shoulders 37 often called "seagulls' wings" and extending over the whole length of the sitting portion —is shown respectively with continuous lines for its mean position, with broken lines for its rear position corresponding to tall drivers and with chain-dotted lines for its forward position corresponding to drivers of small stature.

In an advantageous arrangement, the space 34 is closed at the upper part by a flexible web 35 which is stretched horizontally between the upper faces of the two cushions forming the two parts of the sitting portion when the front part is in its maximum forward position.

Means are provided for urging this web downwards for the other positions of said front part, which means are formed particularly by an appropriate winder or else, as illustrated in FIG. 7, by at least one helical tension spring 36 extending vertically between the median zone of web 35 and a lower anchorage point forming part of the framework of the sitting portion.

A similar arrangement may be provided for filling the space which is created between the two component parts of the seat-back of the seat, when the top portion 4 is extended upwards.

Following which and whatever the embodiment adopted, an adjustable seat is finally obtained whose construction and use follow sufficiently from the foregoing.

This seat has numerous advantages over those known heretofore, particularly that of being adaptable for supporting drivers of all desirable statures through the very simple operation of a single control member.

As is evident, and as it is clear from the above the invention is in no way limited to those of its modes of application and embodiments which have been more especially considered; it embraces, on the contrary, all variants thereof, particularly :

those in which the backward movement of the front part 16 of the sitting portion is associated with a slight raising of this part, the path o±shaft D being then slightly upwards and rearwards instead of being horizontal or even slightly descending, those in which the level of one at least of the hinge shafts G and H of the tie 27 on links 25 and 26 is adjustable, for adjusting the ratio between the horizontal travel distances of the two shafts C and D, and those in which the rear shaft C of the rear part 15 of the sitting portion is mounted on link 25 for simple pivoting and not vertical sliding, which solution, with respect to the preceding one would simplify assembly and result in more accentuated vertical movements of said rear part, but would require reinforcement of link 25.

I claim:

1. Front seat for a motor vehicle, wherein a sitting portion thereof has a front part and a rear part mounted for sliding horizontally one on the other in the longitudinal direction of the seat and an adjustment mechanism actuated by a single control member and comprising means for modifying the longitudinal position of the front part, the longitudinal position of the rear part and the level of the rear part, so that any backward movement of the front part corresponds to lengthening of the sitting portion and lowering of the rear part, and conversely.

2. Seat according to claim 1, wherein the rear part and the front part of the sitting portion are mounted for pivoting respectively on two horizontal transverse shafts carried by a base of the seat and the adjustment mechanism is arranged so that the rear shaft may move along a first fixed rectilinear or substantially rectilinear path, inclined slightly with respect to the horizontal and descending towards the rear and so that the front shaft may move along a second fixed rectilinear or substantially rectilinear and horizontal or substantially horizontal path with a fixed ratio R between 1.5 and 2.5 between the travel distances of these two shafts.

3. Seat according to claim 2, wherein the angle formed between the two paths is between 10° and 30°.

4. Seat according to claim 2, wherein the rear shaft is connected to a nut cooperating with a first screw connected to the base of the seat and extending along the first fixed path, in that the the front shaft (D) is connected to a nut cooperating with a second screw connected to the base of the seat and extending along the second fixed path (d) and in that rotation of the first screw is tied up with that of the second so that the ratio between the travel distances of the two nuts along their screws is equal to R.

5. Seat according to claim 4, wherein the ratio between the pitches of the two screws is equal to R and in that rotation of these screws is synchronized by cooperation of two truncated cone shaped gears fixed respectively thereto.

6. Seat according to claim 2, wherein the two shafts on which the front and rear parts of the sitting portion are mounted respectively for pivoting are carried by the upper ends of two rigid links the first of which is more inclined with respect to the vertical than the second one and the two lower ends of which are mounted for pivoting about two fixed transverse horizontal shafts of the base of the seat, and in that the two links are joined together by a rigid tie mounted for pivoting thereon about fifth and sixth transverse horizontal shafts, the fifth shaft, connected to the rear link, being relatively close to the lower end of this link whereas the sixth shaft, connected to the front link, is relatively close to the upper end of this link.

7. Seat according to claim 6, wherein the pivoting mounting of the first shaft on the rear link is provided so as to make sliding of this shaft possible parallel to itself along this link, in that said shaft is itself mounted so as to be able to slide parallel to itself along a fixed guide (28) inclined with respect to the horizontal and defining the first above path, and in that the single control member is adapted for adjusting the position of this shaft along its guide.

8. Seat according to claim 1, wherein the top portion of the seat-back, comprising the head-rest, is mounted for vertical sliding in the low portion of this seat-back and in that the adjustment mechanism is adapted so that its single control further modifies the level of said top portion of the seat-back in a rising direction during lengthening of the sitting portion and conversely.

9. Seat according to claim 8, wherein the vertical movement of the top portion of the seat-back is obtained by rotation of an endless screw rotatably mounted in the seat-back and connected axially to this seat-back, which screw cooperates with a nut fast with said top portion, said screw being synchronized with another endless screw mounted for rotation in the rear part of the sitting portion and connected axially thereto, which screw cooperates reversibly with a nut fast with the front part of the sitting portion.

10. Seat according to claim 6, wherein a crank lever is mounted for pivoting about a seventh transverse horizontal shaft connected to the rear part of the sitting portion, in that the end of one of the arms of this lever is coupled by a substantially horizontal link to the front part of the sitting portion and in that the end of the other arm of said lever is coupled by a substantially vertical link to the top portion of the seat-back.

11. Seat according to claim 1, wherein a space freed by relative movement apart of the two parts forming the sitting portion or the seat-back is closed externally by a flexible web which is permanently stretched towards the inside of the seat by appropriate resilient means.

* * * * *